(12) United States Patent
Heepe et al.

(10) Patent No.: US 12,214,581 B2
(45) Date of Patent: Feb. 4, 2025

(54) BODIES THAT ELIMINATE THE OCCURRENCE OF THE STICK-SLIP EFFECT

(71) Applicant: Gottlieb Binder GmbH & Co. KG, Holzgerlingen (DE)

(72) Inventors: Lars Heepe, Tübingen (DE); Julia Kasberger, Altdorf (DE); Halvor Tramsen, Holzgerlingen (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 34 days.

(21) Appl. No.: 18/030,104

(22) PCT Filed: Sep. 14, 2021

(86) PCT No.: PCT/EP2021/075160
§ 371 (c)(1),
(2) Date: Apr. 4, 2023

(87) PCT Pub. No.: WO2022/073725
PCT Pub. Date: Apr. 14, 2022

(65) Prior Publication Data
US 2023/0364881 A1 Nov. 16, 2023

(30) Foreign Application Priority Data
Oct. 6, 2020 (DE) .................... 10 2020 006 092.7

(51) Int. Cl.
*B32B 3/16* (2006.01)
*B32B 3/12* (2006.01)
(Continued)

(52) U.S. Cl.
CPC ............... *B32B 5/073* (2021.05); *B32B 3/12* (2013.01); *B32B 3/18* (2013.01); *B32B 3/266* (2013.01); *B32B 5/024* (2013.01); *B32B 2250/02* (2013.01); *B32B 2255/02* (2013.01); *B32B 2274/00* (2013.01); *B32B 2307/542* (2013.01);
(Continued)

(58) Field of Classification Search
None
See application file for complete search history.

(56) References Cited

U.S. PATENT DOCUMENTS

| 5,540,970 A | 7/1996 | Banfield et al. |
| 2017/0009847 A1 | 1/2017 | Mitsutomi |

FOREIGN PATENT DOCUMENTS

| CN | 105992891 | 10/2016 |
| DE | 1 560 793 | 4/1974 |

(Continued)

OTHER PUBLICATIONS

International Search Report (ISR) issued Jan. 4, 2022 in International (PCT) Application No. PCT/EP2021/075160.
(Continued)

*Primary Examiner* — Alexander S Thomas
(74) *Attorney, Agent, or Firm* — Wenderoth, Lind & Ponack, L.L.P.

(57) ABSTRACT

A body includes at least two components, of which one component is a carrier part (10) having functional elements (12) protruding from the carrier part (10) and the other component is an elastomer layer (14) that opens out at a surface (16) that protrudes beyond the functional elements (12), which are at least partially embedded in the elastomer layer (14).

17 Claims, 4 Drawing Sheets

(51) Int. Cl.
*B32B 3/18* (2006.01)
*B32B 3/26* (2006.01)
*B32B 5/02* (2006.01)
*B32B 5/06* (2006.01)

(52) U.S. Cl.
CPC ... *B32B 2307/726* (2013.01); *B32B 2307/744* (2013.01)

(56) References Cited

FOREIGN PATENT DOCUMENTS

| | | |
|---|---|---|
| DE | 100 39 937 | 3/2002 |
| DE | 101 06 705 | 4/2002 |
| DE | 102 23 234 | 12/2003 |
| DE | 10 2004 012 067 | 10/2005 |
| DE | 10 2005 043 452 | 3/2007 |
| DE | 10 2008 051 474 | 4/2010 |
| DE | 10 2018 213 742 | 2/2020 |
| EP | 3 076 044 | 10/2016 |
| WO | 2016/201308 | 12/2016 |

OTHER PUBLICATIONS

Decision on Examination issued May 20, 2024 in corresponding Taiwanese Patent Application No. 110136473, together with English translation thereof.

BODIES THAT ELIMINATE THE OCCURRENCE OF THE STICK-SLIP EFFECT

FIELD OF THE INVENTION

The invention relates to a body with an elastomeric surface which leads to improved adhesive and friction properties-in particular, when the body interacts with wavy and non-smooth surfaces of third components.

BACKGROUND OF THE INVENTION

A structured surface of a solid body with increased adhesion capability is known from DE 102 23 234 A1, wherein the surface has structuring which comprises a plurality of projections, each of which is provided with a foot part and a head part, the head part having an end face pointing away from the surface, and each projection having a size such that all the end faces are at the same perpendicular distance from the surface and thus form an adherent contact face which is interrupted by mutual distances between the end faces.

In the known solution, the surface or contact face is formed by the entirety of the end faces of all the projections, wherein the contact face touches the surface of the other object, without entering into an anchorage and without interlocking of the projections. In this respect, the adhesive connection is mediated by Van der Waals forces. Additional contributions to the adhesion can be provided by electrostatic forces or capillary forces. The distances between the projections are smaller than the cross-sectional dimensions of the end faces mentioned.

DE 10 2008 051 474 A1 discloses a body consisting of an elastomeric material or having an outer elastomeric layer, wherein, in one region of the body, a surface structure improving the friction behavior is molded into the surface of the elastomeric body or into the outer elastomeric layer of the body.

For this purpose, the surface structure has a plurality of elevations, which in particular have a prismatic, truncated pyramid, cylindrical, truncated cone, or mushroom shape and, spaced apart from one another by channels, span a common plane with their end faces, wherein the maximum areal extent of the end faces of the elevations is in each case in the range of 100 nm to 5 mm.

The known body with the proposed surface structure is characterized in that a liquid is displaced from the surface of the elevation by the surface, pressed on with a pressure force, of a body meshing with the elastomeric body, and is drained via the channels. The effect is assisted by the elevations deforming and spreading under load. Therefore, with the aid of the surface structure mentioned, regions remaining substantially liquid-free are provided on the surface of the elastomeric body, even when there is contact with a liquid-wetted surface, and therefore also provide sufficient frictional force under these conditions.

In particular, the stick-slip effect occurring during the pairing of dry surfaces is eliminated, said stick-slip effect indicating the jerkily interrupted sliding of solid bodies that move against one another, in which a rapid movement sequence of adhering, bracing, separating, and sliding off of the surfaces in contact takes place. By avoiding or decreasing the stick-slip effect, unwanted vibrations which lead to noise emission can be avoided, and abrasion damaging the material is prevented.

SUMMARY OF THE INVENTION

Proceeding from this prior art, the object of the invention is to provide an improved solution compared to the prior art, while maintaining its advantages.

According to the invention, the body includes at least two components, of which one component is a carrier part having functional elements protruding from the carrier part, and the other component is an elastomer layer that opens out at a surface that protrudes beyond the functional elements, which are at least partially embedded in the elastomer layer. The hierarchical structure of elastomer layer and the functional elements results in an increased adaptability-in particular, if the flexible functional elements can bend under exertion of pressure from the end face of the surface of the elastomer layer-which leads to a reduced mechanical stiffness, but which leads to an improved nestling of the elastomer layer surface against surfaces of third components of almost any design. In particular, the segmentation discussed here achieves improved adaptability to wavy and non-smooth surfaces.

On the other hand, a very high mechanical stability is achieved, as viewed in the shear and tensile direction, in that the functional elements can stretch fully, as viewed in the loading direction. This results in an anisotropy of the mechanical stiffness under the compressive and tensile load of the functional elements. In comparison with an elastomer layer known in the prior art, an increased mechanical stability of the functional layer is achieved by the functional elements embedded in the elastomer, so that, in this respect, a type of fiber-reinforced elastomer is produced, which is, correspondingly, functionally reliable in the long term, even if the body is used repeatedly. It has also been shown in practical tests that the so-called stick-slip effects are particularly effectively avoided due to the relative mobility between the carrier part and the elastomer layer.

In a preferred embodiment of the body according to the invention, the elastomer layer is provided with structuring that subdivides at least the surface of the elastomer layer into segments. The subdivision thus results in individual drainage channels, which can drain any excess liquid present from the contact region between the elastomer surface and the third component. Even if larger quantities of fluid or liquid occur, high friction values are thus maintained between the elastomer surface and the corresponding surface of the respective third component during functioning. The drainage of liquids, which can also be contaminated with particles, does not take place in closed channels, as disclosed in some cases in the prior art, but rather along channels that are open to the outside. Liquids and particles can thus be transported away in the functional layer.

It is, preferably, further provided that the individual segments, continuously spaced apart from one another, between them delimit the channels, which debouch at the edge of the elastomer layer, which facilitates effective surface drainage.

A particular advantage of this segmentation is also that, if any elastomer surfaces are defective due to abrasion or the like, rapid material failure of the surfaces due to crack propagation does not occur, as is otherwise the case with the known closed elastomer layers, but only a single segment is possibly damaged, without having a disadvantageous effect on the other adjacent segments. As a result of the channels mentioned, which delimit the segments in a completely radical way from one another, there is also a rapid drainage of any excessive liquid present, so that the risk of unwanted aquaplaning is effectively counteracted. In this respect, the structured adhesive surface leads to an additional increase in the adhesive force in comparison with otherwise closed faces of the functional bodies.

In a further preferred embodiment of the body according to the invention, the segments of the elastomer layer, designed as islands, form the surface completely separately from one another on their one free end face and are, at their other, opposite end faces, at a predeterminable axial distance from the carrier part, into which the foot ends of the functional elements open out, the head ends of which are embedded in the elastomer layer. In addition to a further improved adaptability to surfaces of third components, the transport not only of liquids, but also of dirt particles, away from the region of the contact face is achieved by the island segmentation mentioned. If the elastomer layer of the body is preferably formed from multiple plies, of which one ply receives the free ends of the functional elements, and another ply, which is kept free of the functional elements, forms the surface, the functional elements can be embedded in a relatively soft elastomer layer ply, and the exposed elastomer layer ply lying above can be more stable and abrasion-resistant, which ensures long-lasting use of the body without impairing the adaptability thereof.

In a further preferred embodiment of the body according to the invention, the gap distance between the islands is freely predeterminable, and in particular the mutually-adjacent side walls of the islands at least partially have sloping faces. In this way, even larger dirt particles can be conducted away from a liquid via the contact surface into the interior of the body between the functional elements, so that a type of filtering effect against particulate fluid soiling is inherent in the body. Preferably, the distances between the islands are kept free of functional elements, and the layer thicknesses of the islands are identical.

In a further preferred embodiment of the body according to the invention, the surface of the elastomer layer is further functionalized on its side facing away from the functional elements, and in particular coated, structured, or provided with additional adhesive elements. In this way, improved adhesion of the elastomer surface to surfaces of third components can be achieved, and in particular a cooperation between the surfaces from a technical standpoint. It also contributes to this if, further preferably, the carrier part is further functionalized on its side opposite the functional elements, and in particular is provided with an adhesive coat, further closure material, or with information-bearing and/or information-processing structures. In this way, the body can be firmly connected to other third components via the adhesive application or can be fastened in an again releasable manner by means of the further closure material. The body equipped with artificial intelligence can also be used as a repositionable electrical input interface in the sense of a type of sensor mat, which is also suitable as a keyboard.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
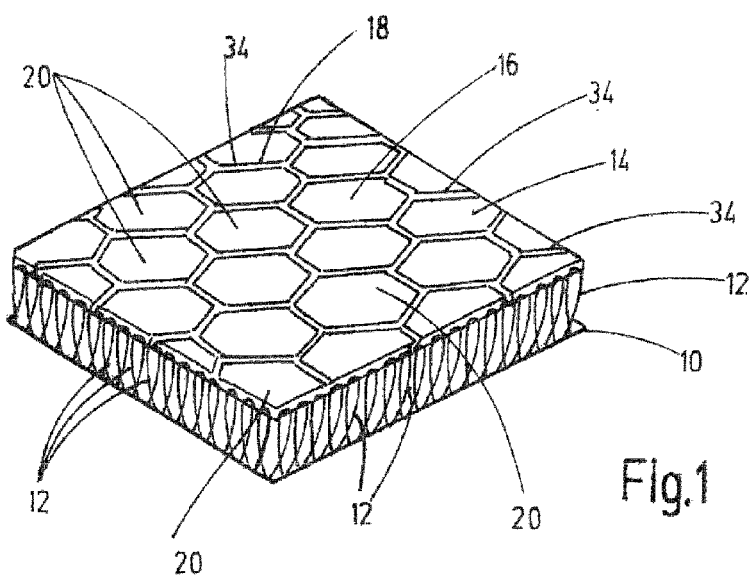
FIG. 1 is a perspective view of a body according to an exemplary embodiment of the invention.

The body according to FIG. 1 has two components, of which one component is a carrier part 10 having functional elements 12 protruding from the carrier part 10, and the other component is an elastomer layer 14 that opens out at a surface 16 that protrudes beyond the functional elements 12, which are at least partially embedded in the elastomer layer 14. In the exemplary embodiment according to FIG. 1, the elastomer layer 14 is provided with structuring 18, which subdivides the surface 16 or the elastomer layer 14 into island-like segments 20, which form hexagons in the embodiment according to FIG. 1. The body according to FIG. 1 has a rectangular shape and forms a kind of cuboid. The cuboid shown, and thus the body, can be extended in all directions, provided that this proves expedient for later use. If the island-shaped segments 20 open out at a free end face of the elastomer layer 14, they are accordingly cut off by the edge of the surface 16 and thus no longer, as a whole, form a hexagon, but, depending upon the edge cut, a corresponding polygon.

Like the body as a whole, the sheet-like carrier part 10 can also be lengthened as desired both in one and in the other direction within the image plane, and, if the carrier part 10 is woven, the geometric dimensions of the resulting sheet structure are dependent upon the specifications of the weaving device on which the carrier part 10 is manufactured. In particular, the carrier part 10 with the functional elements 12 arranged thereon can, for later use, be finished in the manner of touch-and-close fastener tapes wound up in a roll-like manner. The carrier part 10 with the protruding functional elements 12 consists of warp threads and weft threads which, woven in a transverse arrangement with one another, form a base fabric for a touch-and-close fastener part. In this respect, thread-like functional elements 12 are introduced into the base fabric in the form of the carrier part 10, in the manner of pile threads, which represent a further functional component of the carrier part 10. The respective thread-like functional element 12 then forms the individual functional or closure elements for the sheet-like touch-and-close fastener part, which will be explained in more detail below. Furthermore, in technical terms, yarns or yarn systems are often referred to, instead of the threads used for the functional elements 12. The carrier part 10 does not need to be formed from a woven fabric, but can also be of a mesh fabric—for example, in the form of a warp—or weft-knitted fabric. The mesh fabric is not based upon a straight introduction of thread, but a mesh-forming looping of the threads into one another. By means of corresponding systems, a third dimension can also be produced here by means of pile threads, which, according to the invention, can form the functional elements 12. Furthermore, the functional layer can be made of a fleece/nonwoven. The fiber elements required for the functional layer can either be produced directly from the nonwoven fabric (for example in the form of a needlefelt with loops, manufactured on a DI-LOUR machine (manufactured by DILO)), or the elements of the functional layer are subsequently introduced by means of so-called tufting or in the framework of a stitch-bonding process.

Figure 14:
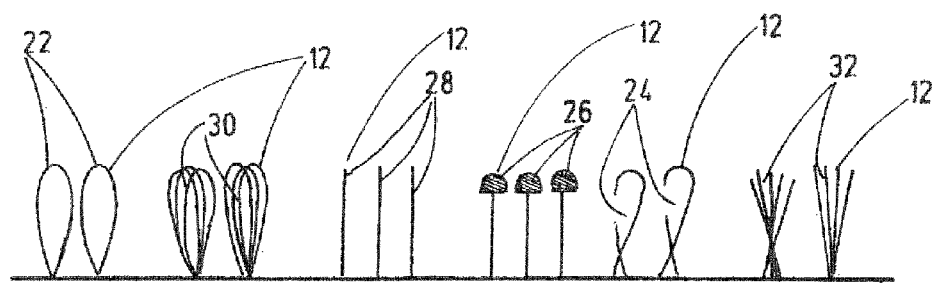

The respective weft thread of the carrier part 10 is curved in the manner of a sine or cosine wave and, at the crossing points between warp threads and weft threads, the warp threads run parallel to the production direction of a weaving machine and parallel to one another in a straight arrangement. In one possible embodiment, only the weft threads run in a curved manner in the base fabric, wherein the respective weft thread passes in an alternating sequence over one warp thread and under the one immediately following in series. At the location where the thread passes under the warp fabric, the functional thread or pile thread forms an overlying loop 22, as is illustrated by way of example in FIG. 14 standing up on the far left side of the carrier part 10. The incorporation of loops into the base fabric in the form of the carrier part 10 can be realized in the manner of a V-shaped binding; however, other types of binding are also conceivable here—for example, the incorporation of the respective functional thread in a W-shaped manner or the like. As shown in FIG. 1, such loops 22 are used for producing the body as a whole; however, it is also possible to cut the loops 22 open along a separating line 24, so that a type of curved hook arises, as seen in the illustration according to FIG. 14 (second solution from the right).

If the separating line runs on the upper side of a loop 22, and the free ends of the open loop are melted, a mushroom-shaped closure element 26 is formed in each case. If the melting is omitted, thin-stemmed elements 28 are obtained, e.g., after carrying out a stretching or combing process, according to the illustration of FIG. 14. Furthermore, it is possible to obtain multiple loops in the form of a loop bundle 30 by using multi-thread systems, and, if these loop bundles 30 are cut off in the transverse direction at the head end, parallel to the course of the carrier part 10, this results in a randomly oriented fiber profile for the elements 32, as shown on the far right seen in the viewing direction of FIG. 14. However, the carrier part 10 can also be formed from a closed plastic strip (not shown), and the preferably mushroom-shaped functional elements 12 arranged thereon are then an integral component of the carrier part 10, and such a component for the body can be obtained using a casting or chill-roll method. Such solutions, including the production method, are disclosed by way of example in DE 100 39 937 A1. Furthermore, it is possible to obtain such components using a 3-D printing method, as is disclosed by way of example in DE 101 06 705 C1, or using a flocking method—for example, as disclosed in DE 10 2005 043 452 A1.

Preferably, however, the one component of the body consists of a three-dimensional textile, as presented above, and an elastomer layer 14, which completely or partially embeds the pile elements of the textile and forms a closed surface 16 (FIGS. 2 and 3), or which is segmented, as shown for example in FIG. 1. In the embodiment according to FIG. 1, the elastomer layer 14 is applied as a thin layer on the head-end closure material 22 in the form of the functional elements 12. In addition to commercially available elastomers, thermoplastic elastomers or blends of these materials, including pure thermoplastics, are also used for the elastomer layer 14. Overall, materials such as polysiloxanes, polyurethanes, natural rubbers, SBR, EPDM, including polyvinyl siloxanes and PDMS, are used for the elastomer layer 14. To produce the body according to FIG. 1, the functional elements 12 of equal height arranged on the carrier part 10 can be immersed in a bath that is filled with the respective elastomer material in liquid form. After a certain curing time after removal from the immersion bath, a solid elastomer layer 14 then remains and forms the body as a further component, wherein the loop ends of the loops 22 are received completely at the head end by the underside of the elastomer layer 14, as seen in the viewing direction toward FIG. 1. Depending upon the depth of immersion into the immersion bath, elastomer layers 14 of different thicknesses can be formed for the body, as shown by way of example in FIGS. 2, 3; 5, 6, once in the form of a continuous surface 16, or in segmented form. In the case of full thickness of the elastomer layer 14, this extends from the surface 16, which is exposed at the end face, to the foot-end transition of the functional elements 12 or the loops 22 into the upper side of the associated carrier part 10, wherein, according to the illustration of FIGS. 3 and 6, a small axial distance remains. In addition to the described dip bath method, the elastomer layer 14 can also be applied to the one component of the body consisting of carrier part 10 and the functional elements 12 by means of a doctor blade method or a spray application method. Otherwise, it is also possible to use laminating and lining processes for the production.

As is further shown in FIG. 1, the segments 20 of the elastomer layer 14 are formed as hexagonal or honeycomb-shaped islands, wherein the segments 20 form the surface 16 at their upper, free end face, completely separated from one another via zigzag-shaped channels 34. On its other, lower free end face, the elastomer layer 14 is at a predeterminable axial distance from the carrier part 10, into which the foot ends of the functional elements 12 open out, the head ends of which are completely embedded in the elastomer layer 14. The surface configuration for the body according to FIG. 1 is merely exemplary, and there are a large number of design options for the surface 16, which can thus also form an ornament. Thus, channels 34 can also be arranged in a straight line or in the form of a checkerboard pattern in the surface 16, or they can be introduced into the surface 16 in a wave shape. Furthermore, it is possible for the channels to be made so narrow that the island-like segments 20 abut one another directly with their side edges.

Figure 4:
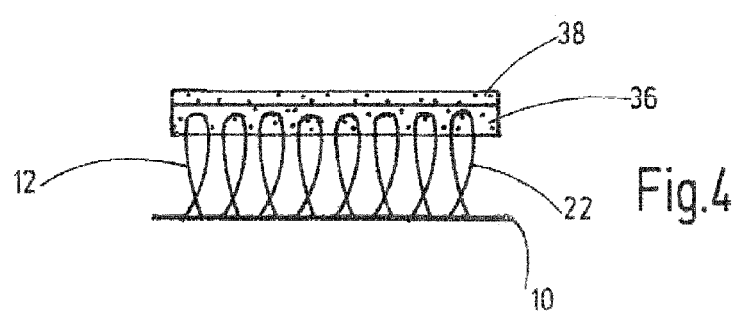
Figure 5:
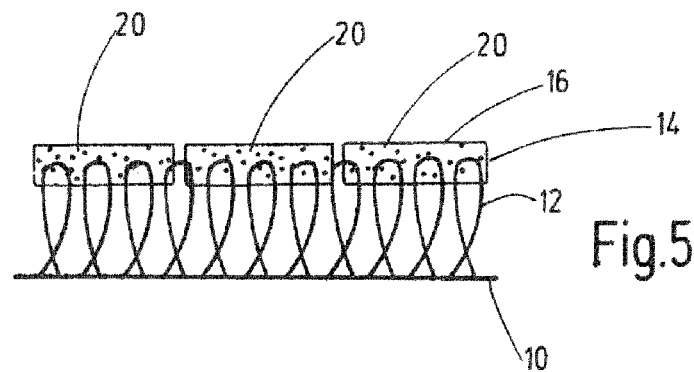
Figure 6:
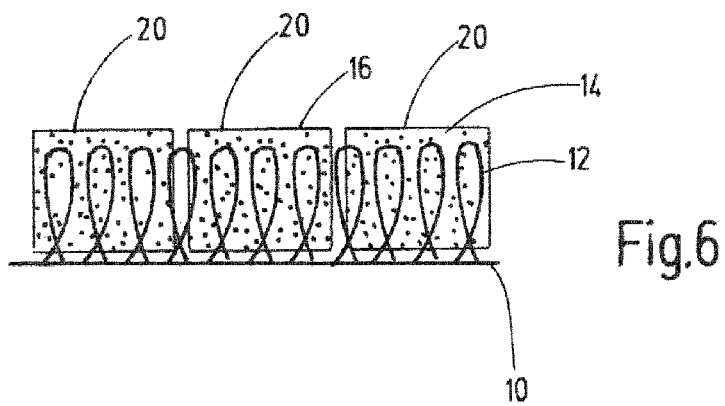

As is also shown in FIG. 4, the elastomer layer 14 can consist of multiple plies, e.g., two plies, of which one ply 36 receives the free ends of the functional elements 12, and the other ply 38 lying above, which is kept free of the functional elements 12, forms the surface 16 which, according to the illustration of FIG. 4, can be closed or else segmented according to the exemplary embodiments of FIGS. 5 and 6. Such a ply structure for an elastomer layer 14 can also be obtained by means of a doctor blade or other application method. Laminating and (foil) lining processes can also be used.

Figure 7:
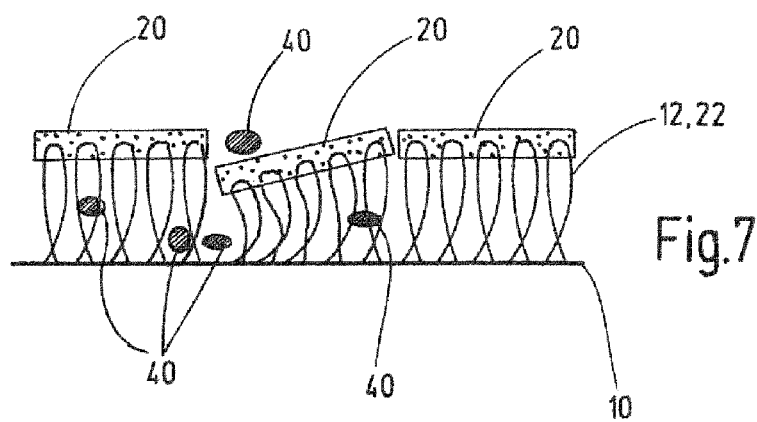

As the side view according to FIG. 7 shows, the loop-like functional elements 12 can bend or buckle, so that the distance of a channel 34 between adjacent segments 20 can be increased, which opens up the possibility that particles 40 overcome the gap-like channel 34 and pass from the surface 16 onto the underside of the elastomer layer 14, and are held there in the loops 22 of the functional elements 12. In this way, particles 40 could be retained from a liquid stream, so that the body then has a filtering significance. If the fluid pressure drops on the upper side of the surface 16, the functional elements 12 are able to restore the kinked segment 20, so that all the segments open out with their upper side in a common planar surface 16.

Figure 8:
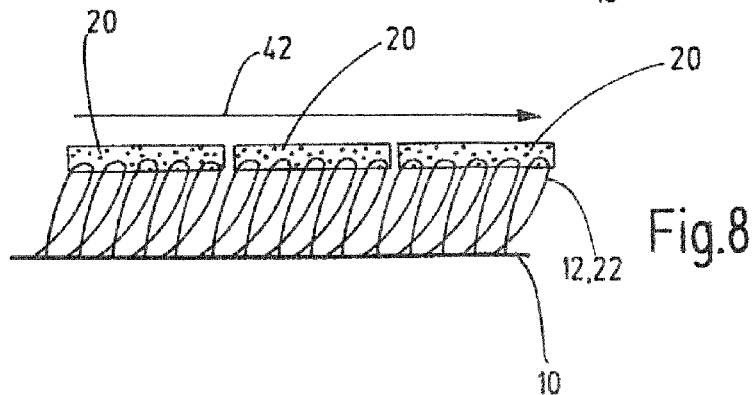

In the illustration according to FIG. 8, it is again clear that, in the case of an oblique force introduction in the direction of arrow 42 parallel to the orientation of the carrier part 10, the individual functional elements 12 are stretched or extended, and, due to the fixed anchoring points at the foot end in the direction of the carrier part 10 and at the head end in the direction of the elastomer layer 14, this body allows the absorption of high transverse forces in the form of shear forces.

Due to the hierarchical structure of the body formed from a textile with a standing pile, which is completely or partially embedded in the elastomer, which is divided continuously or into segments 20, a completely new, very complex structure is achieved, which has a significantly higher adaptability to surfaces, if the body with its surface 16 comes into contact with such surfaces of third components (not shown). Not only can the elastomer layer 14 as described deform for contact formation, but also the underlying textile 10 with its pile elements 12 can deform in order to adapt to uneven substrate surfaces, as indicated in FIG. 7. When the contact face or surface 16 is wetted with liquids, it can flow off both through the channels 34 existing between the segments 20 and past the segments 20 into the pile structure of the textile, and can be drained there below the elastomer layer 14 to the side into the environment. In this case, a significantly higher drainage performance is provided in comparison with a structured, but one-piece, elastomer surface. The three-dimensional textile behind the segmented elastomer surface acts as a buffer, and can absorb a large amount of liquid in a short time and remove it effectively from the contact zone of the body and an adjacent substrate. In addition, as shown, an increased resistance to soiling with particles 40 is achieved. Since, in the deformation by particle soiling in the contact face, only individual segments 20 are brought restorably out of their position by deformation of the functional elements 12 (FIG. 7), and the remaining elastomer surface remains in contact with the substrate or third component, significantly less force is exerted than in the case of a continuous elastomer surface according to the prior art without a hierarchical structure. In the case of transverse movement, small particles 40 can also be conducted away between the segments 20 to the pile elements or functional elements 12, and can thus equally be removed from the contact face 16. The fiber-reinforced elastomer composite according to the illustration of FIG. 1 is also more stable and abrasion-resistant than a purely closed elastomer layer, thanks to the embedding of the functional or pile elements 12 in the elastomer layer 14. In comparison with such an elastomer layer, e.g., in the manner of a so-called foam back, anisotropic stiffness is achieved, which, during compression, leads to a high adaptability by bending and buckling of the functional elements 12, while an increased stiffness is present in the shear and tensile direction.

Figure 9:
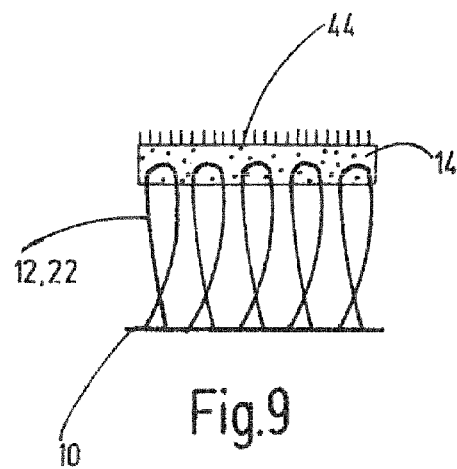

FIG. 9 shows, in cutout, that the surface 16 of the elastomer layer 14 is further functionalized on its side facing away from the functional elements 12, and in particular is provided with additional adhesive elements 44. These can, for example, be adhesive elements 44 with widened ends (not shown), the adhesion of which to third components is realized predominantly by means of Van der Waals forces. Such adhesive elements 44 are integrally connected to a continuous carrier strip, which can be attached to the surface 16—for example, in an adhesively-bonded manner. A method for producing such adhesive elements 44 on a carrier material is disclosed in DE 10 2004 012 067 A1.

Figure 10:
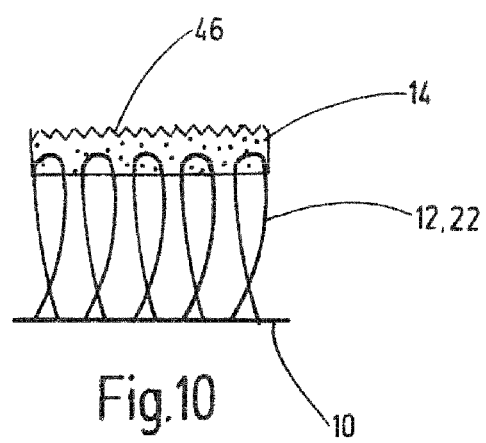

In the embodiment according to FIG. 10, however, further structuring 46 is introduced into the surface 16 in order to increase the roughness of the surface 16, for example.

Figure 2:
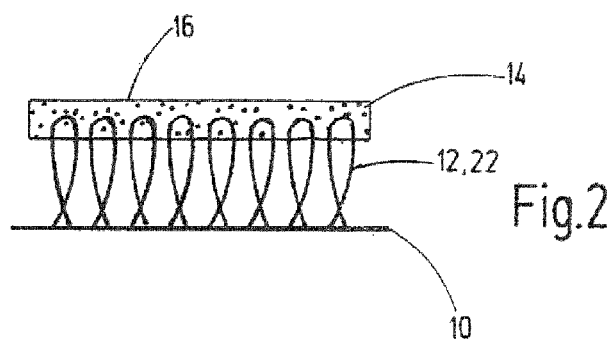
FIGS. 2 through 17 are partial end views of bodies according to further exemplary embodiments of the invention.
Figure 3:
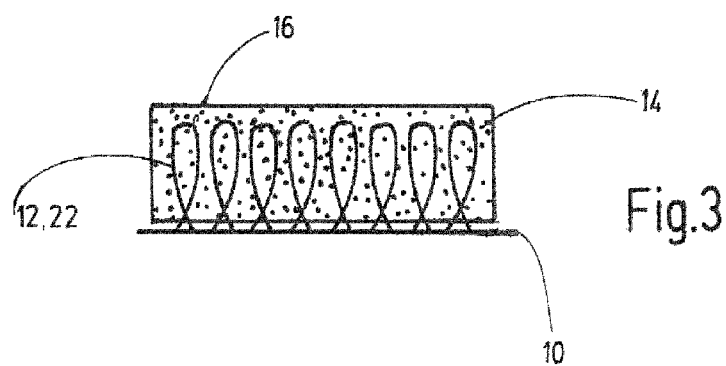
Figure 11:
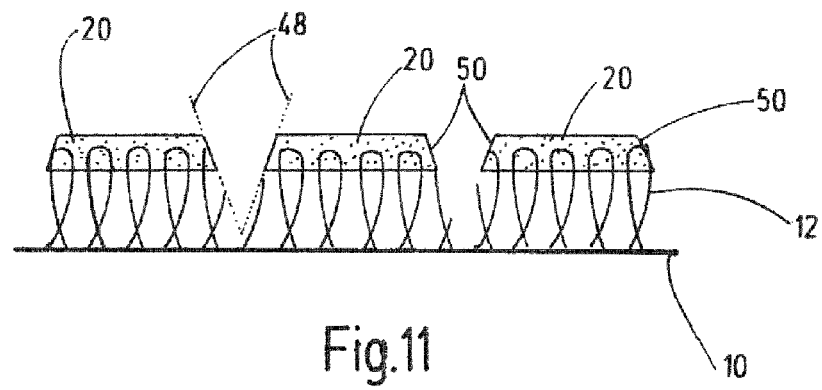

In the embodiment according to FIG. 11, a closed elastomer layer 14 with a continuous surface 16 is initially present, according to the exemplary embodiment of FIG. 2, and, from the free end face of the body, a wedge-shaped cut is then introduced, of which, in FIG. 11, the cutting lines 48 are only indicated. The cut along the cutting lines 48 is made in such a way that any underlying functional elements 12 in the form of the loops 22 are cut as well. Overall, segments with sloping inclined faces 50 are produced as a result, which enable the increased entry of liquid or dirt particles into the planes between the carrier part 10 and the underside of the segments 20. Similar to the cut profile with the cutting lines 48, the inclined faces 50 of two adjacent segments 20 extend conically towards one another in the direction of the carrier part 10.

Figure 12:
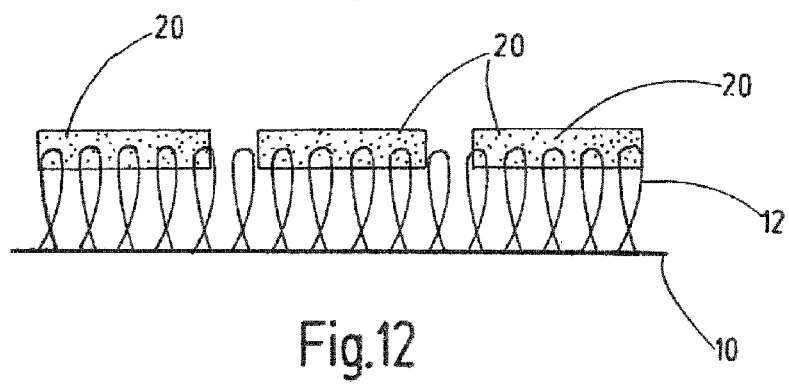
Figure 13:
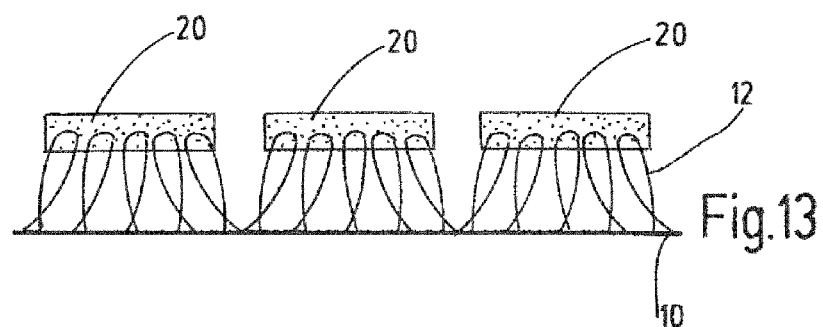

In the embodiment according to FIG. 12, the distance of a channel 34 can be occur by a straight cut, which is carried out in such a way that functional elements 12 between two adjacent segments 20 remain unaffected. In the embodiment according to FIG. 13, however, functional elements 12, assembled into groups of five and inclined towards one another, are fixed at the head end in a segment 20. Cutting blades, lasers, punching devices, etc., can be used for cutting the surface 16 or the elastomer layer, or even thermal and water-jet cutting is possible.

Figure 15:
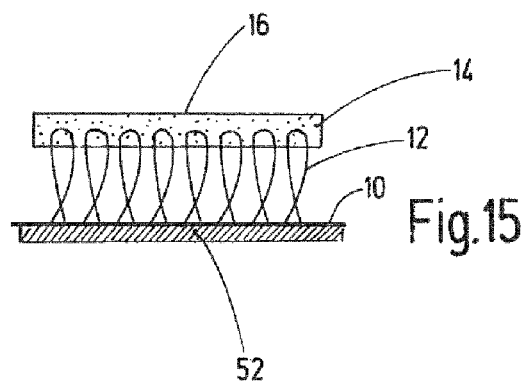
Figure 16:
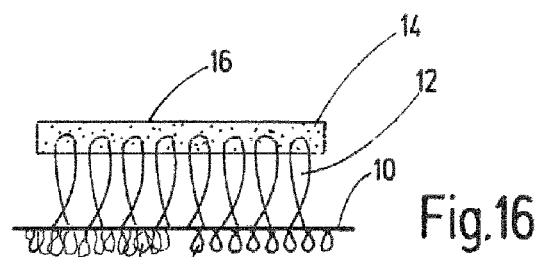
Figure 17:
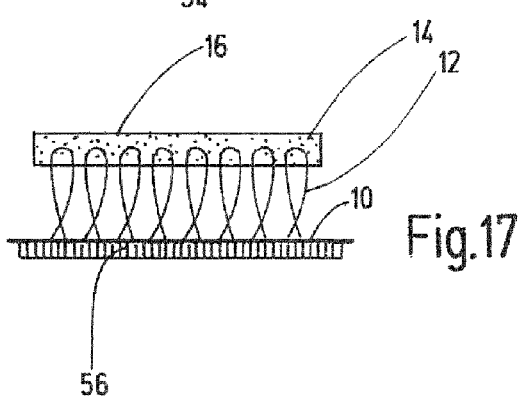

In the embodiments according to FIGS. 15 through 17, in a solution as shown in FIG. 2, the carrier part 10 used is further functionalized on its side opposite the functional elements 12, and in particular provided with an adhesive coat 52 (FIG. 15), a further closure material 54 (FIG. 16), or with information-bearing and/or information-processing structures 56 (FIG. 17).

With the body according to the invention, with its large number of possible design options, which are not listed exhaustively here, a "friction and adhesion performance" increased by hierarchical construction is achieved, with, at the same time, increased robustness against soiling of the contact face of the body substrate (third component) by liquids or solids.

While various embodiments have been chosen to illustrate the invention, it will be understood by those skilled in the art that various changes and modifications can be made therein without departing from the scope of the invention as defined in the claims.

The invention claimed is:
1. A body, comprising:
   a first component being a carrier part having functional elements protruding from the carrier part;
   a second component being an elastomer layer that opens out at a surface that protrudes beyond the functional elements, the functional elements being at least partially embedded in the elastomer layer; and
   a surface of the elastomer layer being provided with additional adhesive elements on a side of the elastomeric layer facing away from the functional elements.
2. The body according to claim 1 wherein the elastomer layer is provided with structuring that subdivides at least the surface into individual segments.
3. The body according to claim 2 wherein the individual segments are spaced apart from one another and delimit channels between the individual segments, the channels debouching at edges of the elastomer layer.
4. The body according to claim 2 wherein the individual segments of the elastomer layer are designed as islands, form the surface (16), are completely separately from one another on one free end faces thereof and are, at other opposite end faces thereof, at a predeterminable axial distance from the carrier part into which foot ends of the functional elements open out, head ends of the functional elements being embedded in the elastomer layer.

5. The body according to claim 2 wherein
gap distances between the individual segments are predeterminable; and
mutually-adjacent side walls of the individual segments at least partially have sloping faces (50).

6. The body according to claim 5 wherein
the gap distances between the individual segments are free of functional elements.

7. The body according to claim 2 wherein
the individual segments have identical layer thicknesses.

8. The body according to claim 1 wherein
the elastomer layer is formed of first and second plies, the first one ply receiving free ends of the functional elements, the second ply being free of the functional elements and forming the surface.

9. The body according to claim 1 wherein
the side of the surface of the elastomer layer is coated.

10. The body according to claim 1 wherein
the side of the surface of the elastomer layer is structured.

11. The body according to claim 1 wherein
the carrier part, on a back side thereof opposite the functional elements, is provided with an adhesive coat.

12. The body according to claim 1 wherein
the carrier part, on a back side thereof opposite the functional elements, is provided with closure material.

13. The body according to claim 1 wherein
the carrier part, on a back side thereof opposite the functional elements, is provided with information-bearing and/or information-processing structures.

14. A body, comprising:
a first component being a carrier part having functional elements protruding from the carrier part; and
a second component being an elastomer layer that opens out at a surface that protrudes beyond the functional elements, the functional element being at least partially embedded in the elastomer layer, the elastomer layer being provided with structuring that subdivides at least the surface into individual segments.

15. The body according to claim 14 wherein
gap distances between the individual segments are predeterminable; and
mutually-adjacent side walls of the individual segments at least partially have sloping faces (50).

16. The body according to claim 15 wherein
the gap distances between the individual segments are free of functional elements.

17. The body according to claim 14 wherein
the individual segments have identical layer thicknesses.

* * * * *